QUICK OPENING CLOSURE CAP

BACKGROUND OF THE INVENTION

The present invention generally consists of a quick opening vessel or pipeline closure device and more specifically consists of a cylindrical hub or base and an ellipsoidal or curved domed cap which utilizes cam release levers on the swing bolts holding the closure tight against the hub.

The quick opening closure devices of the prior art generally require, for opening or closing, the loosening or tightening of hex nuts on a series of swing bolts stationed around the periphery of the closure cap. Because of the nature of caustic and corrosive liquids stored in the vessels and pipelines, the inadvertent rough handling and physical wear on these swing bolts, and accumulations of rust, dirt, and other contaminants, the bolt threads are often in such bad condition that removal of the closure is difficult and considerable man hours must be expended before removal can be accomplished. Also, paint and rust-prevention compounds which are applied to the entire closure apparatus tend to clog the threads of the swing bolts and further complicate removal.

If the swing bolt threads are machined loose enough to allow easy removal of the hex nuts holding the swing bolts in place, then the hex nuts are capable of working loose by themselves due to temperature and pressure variations both inside and outside the vessel and also through physical vibrations of the vessel or pipeline arising from its use in service.

Accordingly, it is an object of this invention to provide a quick opening and quick sealing closure cap for pipelines, tanks, vessels, and liquid containing apparatus, which closure cap eliminates the need for loosening and tightening numerous swing bolts or other threaded devices such as those found on similar closures in the prior art.

It is a further object of this invention to provide an easy to open closure cap which requires no tools and very little work or exertion by the person removing the cap.

It is a further object of this invention to provide a tight sealing closure cap with sealing ability and safety features superior to any closure devices disclosed by the prior art.

It is also an object of this invention to provide a new swing bolt type fastening apparatus that can be used to provide easier and quicker-opening closure devices such as the one described in this invention.

Other objects and a fuller understanding of the invention may be had by referring to the following description and claims taken in conjunction with the accompanying drawings.

The present invention overcomes the deficiencies of the prior art and achieves its objectives by providing an eccentric cam tightening and releasing device used in conjunction with a modified swing bolt and special hex nut to give a new and valuable fastening device for use on a closure apparatus. Also a new closure device is disclosed where the mating surface of the hub or base is convex rather than flat beveled and faces either outward or inward. The inward facing surface gives a better seal and the outward facing surface directs outward any contaminants which might fall on the mating surface of the base while it is opened in a vertical position. The mating surface of the cap is concave and its radius of curvature is slightly larger than that of the base, giving metal-to-metal contact at two points on the arc, the inside edge and the outside edge. This provides self alignment of the cap on the base and gives two continuous-line sealing surfaces in addition to the sealing provided by an O-ring gasket located in a groove cut into the mating surface of the hub.

A conventional hinge device or pivotal mounting device joins the cap to the base and allows the cap to swing out 0°–270 and swing back into the same position relative to the base. This maintains the alignment between the swing bolts mounted on the base and the swing bolt mounting lugs located on the cap.

BRIEF DESCRIPTION OF THE DRAWINGS

In order to facilitate the understanding of this invention, reference will now be made to the appended drawings of preferred embodiments of the present invention. The drawings should not be construed as limiting the invention but are exemplary only.

In the drawings:

FIG. 1 is a plan view of the assembled closure cap and base;
FIG. 2 is a horizontal view of the closure cap and base;
FIG. 3 is a side view of a typical swing bolt and cam release device;
FIGS. 4 and 6 are blown-up, cutaway views of the mating surfaces of the closure cap and hub with the elastic O-ring gasket enclosed therein; and
FIG. 5 is an isometric view of a partially disassembled swing bolt and cam release assembly showing the swing bolt, eccentric cams and actuating arm.

DESCRIPTION OF THE PREFERRED EMBODIMENTS

A preferred embodiment of the present invention is shown in FIGS. 1–6 in which a conventional closure cap 1, of ellipsoidal or other curved shape, and a welding hub or base 2 of the same inner and outer diameter as the closure cap, are joined by swing bolts 3 which encircle a cylindrical rod or arm 4 which passes through two cam eccentrics 5. The two cam eccentrics are located at each side of the swing bolt and are attached to the arm rod by pinning, welding, or other means of attachment or are made an integral part of the arm. The cam eccentrics are rotatably attached to the hub by enclosing them in rings 6 whose inner diameter is only slightly larger than the eccentrics' outer diameter. These rings are attached permanently to the hub by welding or other means. The closure cap is also attached to the hub by a hinge device 10 which is joined to the hub and the cap and allows the cap to rotate away from the hub from 0°–270° and yet allows it to return to the hub in the same relative position as it was prior to opening.

The cam eccentric is cylindrical with a diameter approximately 50–100 percent greater than that of the arm, having a hole drilled parallel to its cylindrical axis but off-center so that when the arm rod is passed through the eccentric and firmly attached to it, the point of highest eccentricity lies in or near the plane formed by the arm handle, 4a, and the arm rod 4.

Thus, when the arm handle is in a vertical position, parallel with the swing bolt, the arm rod is forced by the eccentric into its lowest position relative to the hub rings, and the swing bolt is pulled downward by the arm rod so that a pre-set tension is placed upon the swing bolt while it is engaged in the cap lugs 6.

The swing bolt is held to the cap by passing it between parallel lugs 6 which have been welded or otherwise attached to the cap. A spacer plate 9 is placed between the two lugs to prevent the swing bolt from misalignment. A washer 8a and hex nut 8 are threaded onto the swing bolt and tightened down on the lugs while the arm 4a is in an upright position. A partially deformed hex nut is used on the swing bolt so that it will not loosen during use. Because all opening and closing is done with the arm and cam device, the hex nut can be set at specified tightness once and seldom has to be touched again. Although tightening the deformed hex nut is difficult this is not a particularly serious disadvantage since the nut has to be tightened only once initially, and very seldom needs to be adjusted.

The eccentric 5 is designed so that the bolt is at or near its tightest position when the arm handle is parallel to and alongside of the bolt. The arm handle can thus travel a small distance further and contact the closure cap. This "locks" the cam eccentric in place because it has passed the point of highest eccentricity and now requires a certain force to bring it back and over in the opposite direction. The amount of force required to bring the arm over and down can be varied by varying the amount of tightness of the hex nut during its initial setting. The tighter the hex nut is set initially, the more force will be required to bring the arm back over and down.

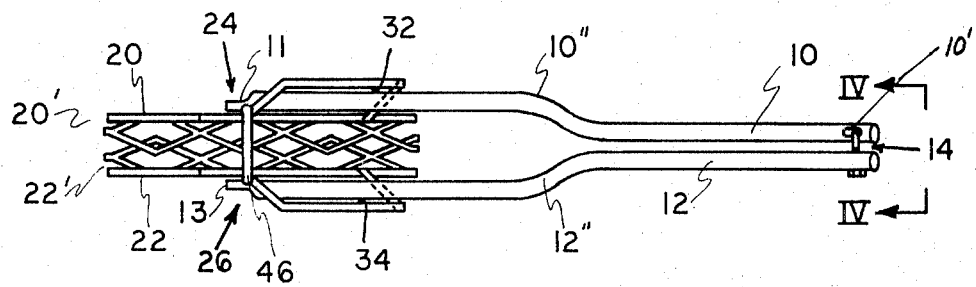
FIG. 2
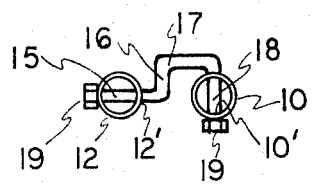
FIG. 4
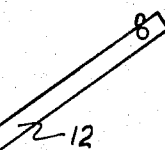
FIG. 1
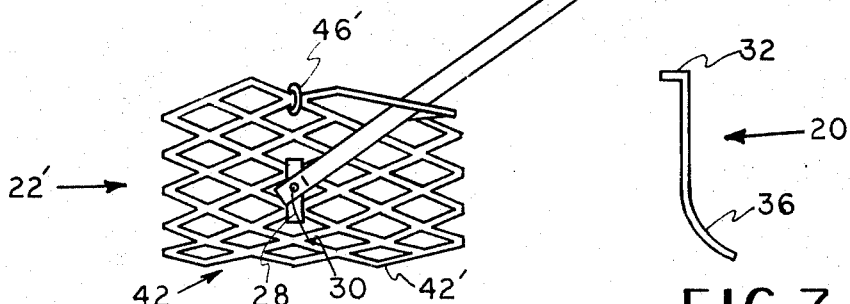
FIG. 7
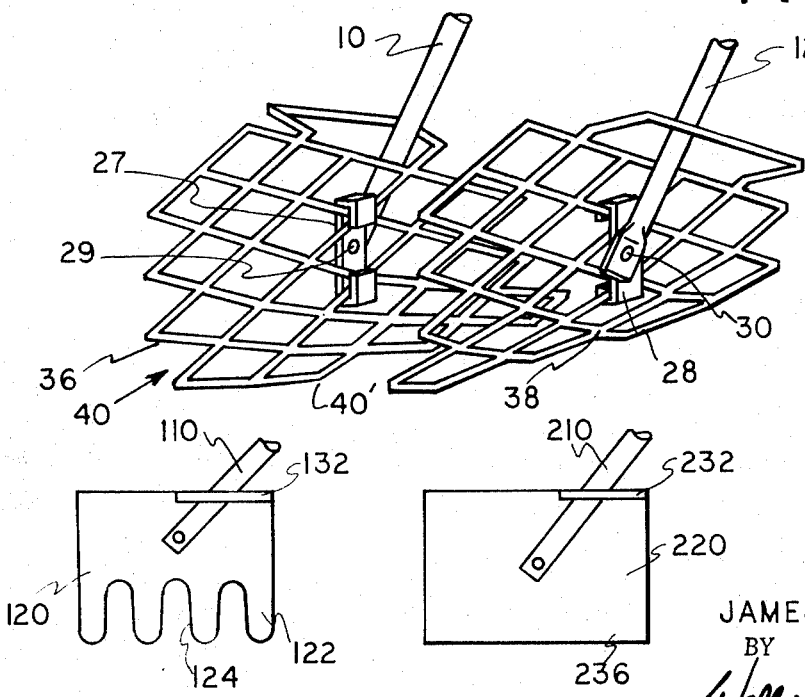
FIG. 3
FIG. 5  FIG. 6
INVENTOR.
JAMES A. BURCKHALTER

LIFTING DEVICE

BACKGROUND OF THE INVENTION

Numerous tools have heretofore been devised for the engagement with and lifting of various and sundry articles. For example, numerous tools have been developed along the lines of the ordinary yard rake where the rake may be employed to gather leaves or the like from the lawn or garden and thereafter upon actuation of a device on the tool to bring an opposing structure into position to entrap the leaves, trash or the like between two tined heads and to enable one to lift this collected debris and deposit same as desired. Such devices are deficient for several reasons. The tines or elongated fingers of the rake are pointed and as such, tend to pierce parts of the debris such as leaves, whereby the pierced objects remain on the tines after the heads are separated to dump the contents. Further, the normal tines are quite flexible whereby the devices are impractical and unsatisfactory for lifting heavy objects since the weight of the objects would overcome the resistence of the tines and fall from within the confines of the opposing heads.

The raking-lifting devices are also generally constructed in such a manner that the lifting must be done with the arms of the device in a vertical position which is uncomfortable and unnatural to the user. Pivot or other connections between the operative elements that control the opposing heads are such that the heads move directly outwardly and are thus subject to engage a pile of debris during separation of the heads. Otherwise, the debris pile must be sufficiently small that the opposing heads will pass thereover.

Aside from the existing devices that are patterned after a rake as mentioned above, numerous tools have been devised for the lifting of other objects such as rock, ice, corrugated containers and nails as well as numerous other items. Certain of these devices do have the heads pivotally connected to a supporting member and the supporting members or arms are generally pivotally associated with each other in some manner. Normally speaking, the arms cross in a scissors-like configuration so that pressure may be applied by squeezing the arms to apply force to each of the heads and urge the heads toward each other to firmly grasp the article to be lifted. These general devices are likewise deficient for the reasons set forth above and additionally because of their intended purposes. For example, the pivotal connections between the heads and arms are designed to insure proper engagement between the heads and the article to be lifted and not to insure adjustability of the device to suit the height of the particular user or the terrain on which the article is to be used. Further, the scissors arrangement requires additional workmanship which increases the cost of the device and also severely limits the degree of manuverability of the device.

The pick-up tool or lifting device of the present invention is an advance over the devices previously mentioned. The present pick-up tool provides a simple and inexpensive device that may be used by the homeowner in pick-up and removal of leaves, bottles, cans, logs, manure, rocks, bricks, dead animals, or any other debris or article that might be present. A smooth contour on the leading edge of the opposing heads permits the heads to be brought together without excessive entanglement with or interference by the surface of the ground. Further, the danger of spearing leaves, paper or the like during the pick-up and removal thereof is eliminated. Thus, once the debris is dropped from between the opposing heads, the device is clean and no debris remains. Moreover, the unique pivotal connection between the arms permits one of the arms to be moved in virtually any arc to surround an article to be lifted in such a manner as to facilitate the ease of lifting and removal thereof. The pivotal connection between the head and arm in conjunction with a slot along the top of the lifting head affords a self-adjusting tool which assumes a proper arm angle to suit the height on any person using same and also simultaneously adjusts to the terrain.

While, as mentioned earlier, other devices similar to the instant invention have been conceived, the prior art is devoid of any teaching or suggestion of the device of the present invention. Exemplary of the prior art are U.S. Pat. No. 103,585 to Dohn; No. 166,599 to Frederick; No. 171,413 to Nelson; No. 1,160,282 to Harris; No. 1,298,064 to Lichtenthaeler; No. 1,370,086 to Callison; No. 1,723,597 to Bannister; No. 2,136,849 to Hembree; No. 2,504,943 to Zifferer; No. 2,891,374 to Richmond; No. 2,908,131 to Ross; No. 2,961,674 to Hunt; No. 3,105,348 to Vosbikian; No. 3,164,945 to Spencer; No. 3,264,809 to Jackson, and No. 3,350,866 to Spencer.

SUMMARY OF THE INVENTION

It is an object of the present invention to provide a novel device that may be employed to pick-up and remove various and sundry objects from the ground.

It is a further object of the present invention to provide a novel pick-up tool having a unique pivotal connection between approximately parallel arms thereof.

Still further, another object of the present invention is to provide a novel pick-up tool having a unique cooperation between the heads and arms of the tool.

Still another object of the present invention is to provide a novel pick-up tool that is self-adjusting to the height of the individual user of the tool.

Generally speaking, the pick-up tool of the present invention comprises a pair of arms, said arms being approximately parallel adjacent one end thereof and being pivotally connected to each other at said end, and a lifting head pivotally secured to an opposite end of each arm, said heads further being curved inwardly at their lower ends and having a smooth contour across the edge of said end.

More specifically, the pick-up tool of the present invention comprises a pair of arms that are approximately parallel at one end and are pivotally secured to each other at said end in a unique manner to permit one of the arms to be moved in a desired arc over and/or around an object or objects to be enclosed between the heads, engaged thereby and lifted. The arms extending downwardly, flair outwardly in opposite directions to a point where they turn back to an approximate parallel relationship for the remainder of the length of the arm. The arms are flattened at their lower ends and pivotally secured thereat to the lifting heads.

The heads employed with the pick-up tool of the present invention are pivotally secured to the arms in such a manner that a vertical plane through the heads is offset and approximately parallel to a vertical plane through the arms. A slot extends along each head for a portion of the width of the head. The arm passes through the slot to its point of pivotal connection with the head. The pivotal connection between the head and arm is loose in such a manner that the arm will automatically move upwardly or downwardly along the slot to a comfortable handling position for the user while the bottom edge of the heads adjusts to the terrain on which it is employed. Hence, the arms of the device would assume a different angle for a very tall individual than for a short individual, each of which are correct for the particular individual.

Pivot connection between the two arms of the device as taught by the present invention permits an almost universal movement of one arm with respect to the other while holding the arms apart from each other. Additionally, the pivot connection assists in properly positioning one head adjacent the other in the closed or locked position. A pivot member extends horizontally through a first arm after which it forms a U-shape, one leg of which extends vertically through a second parallel arm. An opening in one of the arms is in the form of an elongated slot as opposed to a circular opening. As such, slight axial movement is permitted by the arm with the slot to enable the inturned edge of one of the heads to ride over the inturned edge of the opposite head whereby the locking means may be actuated to hold the heads in a closed position.

The heads that are pivotally secured to the arms of the present invention are preferably rectangular in shape and, as mentioned earlier, have a slot extending along the length of the head rearwardly of the pivotal connection between the head and arm. The arm extends through the slot to the pivotal connection with the head whereby movement of the arm about the pivot connection at the head is limited by the dimension of the slot. Such arm movement facilitates self-adjustment of the tool to the height of the individual using same. Virtually any type material can be employed for the head, though for the sake of utility, a light open-frame material is preferred. In this regard, the plate may be perforated or may have a latice work configuration. The bottom edge of the heads are inturned so as to better facilitate the engagement with and lifting of an object and the leading edge of the lower end of the heads has a smooth surface. It is not necessary that the leading edge be flat. Instead, a serrated configuration may be employed, though the forward edges of the serrations or teeth should not be sharp, but instead should be rounded or smooth so as to prevent piercing of objects being lifted.

A latch means is secured at the top of one head and extends across the opening between the heads where it may be attached to the opposite head. In this manner, the arms of the tool may be held together where desirable. A common hook is quite suitable for a latch means and may be hooked and unhooked by manipulation of the arms of the device. In this regard, the flexibility of the arms upon squeezing, causes a like inward movement of the heads where the latch becomes disengaged. The latch may then be flipped aside and the tool employed as intended. Upon reclosing, the latch when in position reattaches to one of the heads after squeezing and releasing the arms.

BRIEF DESCRIPTION OF THE DRAWINGS

FIG. 1 is a side view of a pick-up tool according to the teachings of the present invention.

FIG. 2 is a top view of the pick-up tool according to the teachings of the present invention.

FIG. 3 is an isometric view of a portion of the pick-up tool according to the teachings of the present invention showing the heads in their relative positions.

FIG. 4 is an end view of the assembled arms of a pick-up tool according to the teachings of the present invention taken along lines IV—IV of FIG. 2.

FIG. 5 is a side view of a modification to the present invention.

FIG. 6 is a side view of a further modification of the pick-up tool according to the teachings of the present invention.

FIG. 7 is an end view of a tool head according to the teachings of the present invention.

DESCRIPTION OF THE PREFERRED EMBODIMENTS

Referring to the FIGS., the preferred embodiments of the present invention will now be described in detail. In FIGS. 1 and 2, a side and top view of the pick-up tool of the present invention are illustrated. As can be seen in FIGS. 1 and 2, a pair of arms 10 and 12 are provided with the upper ends thereof being approximately parallel to each other. Arms 10 and 12 are pivotally secured to each other while being held apart by a pivot member 14 (See also FIG. 4). Pivot member 14, as shown in FIGS. 1, 2 and 4 has a section 15 that passes through opening 12' in arm 12 in a horizontal plane and an inverted "U" section comprising vertical legs 16 and 18 and base 17. Vertical leg 18 passes through an elongated slot 10' in arm 10 in a vertical plane and both section 15 and leg 18 are secured within opening 12' and slot 10' by suitable means such as a nut 19 or the like.

Arms 10 and 12 extend downwardly from the pivot point where they flair outwardly in opposite directions at bends 10'' and 12'' turn inwardly to again assume an approximately parallel relationship. Lifting heads 20 and 22 are pivotally secured to arms 10 and 12 respectively at 24 and 26. Heads 20 and 22 are provided with plates 27 and 28 respectively which are secured thereto and through which openings are provided to receive pivot pins 29 and 30. Pins 29 and 30 with their respective assemblies pass through forward flattened ends 11 and 13 of arms 10 and 12 respectively, through plates 27 and 28 and are loosely secured on the opposite sides thereof. Heads 20 and 22 are further provided with slots 32 and 34 positioned along the upper edges thereof. Arms 10 and 12 pass through slots 32 and 34 respectively and are pivotally connected to heads 20 and 22 at pivot connections 24 and 26. Pivot connections 24 and 26 are loose to permit arms 10 and 12 to move between the limits of slots 32 and 34 to properly orient the angle of arms 10 and 12 to the height of the person utilizing the device. Meanwhile, the bottom of heads 20 and 22 adjust to rest normally on the surface on which the device is to be used.

Heads 20 and 22 are provided with inwardly curved lower ends 36 and 38 to provide a better surface for engaging the material to be lifted and holding same between heads 20 and 22 when attempts are made to bring heads 20 and 22 together and entrap the material for lifting and removal. As mentioned earlier, it is not necessary for the edge of curved ends 36 and 38 of heads 20 and 22 to be flat. Instead, a serrated type edge is shown at 40 and 42 respectively and is quite suitable so long as the ends 40' and 42' of the serrations are rounded or smooth. The smooth contour of the edges 40 and 42 thus prevents piercing or otherwise interfering with the material to be picked up and consequently, release of the material from the heads.

As best shown in FIG. 2, head 20 is provided with a latch means 46, one end of which is secured thereto. Latch 46 which may be a conventional hook, extends across and is removably secured to a portion of head 22. In the form shown in FIG. 2, hook 46 extends across the gap between heads 20 and 22 and hooks around a portion of head 22 (See FIG. 1). Unlatching of the heads 20 and 22 is accomplished by merely squeezing arms 10 and 12 together to cause heads 20 and 22 to move inwardly in a similar fashion. As such, the curved end 46' of hook 46 is separated from head 22 and may be moved out of the way. After removal of curved end 46' from head 22, heads 20 and 22 may be moved apart as desired.

As earlier stated, arm 10 is provided with an elongated slot 10' through which pivot member 14 passes. Slot 10' is provided in lieu of a circular opening to afford additional flexibility to the present invention. In this regard, slot 10' permits arms 10 or 12 to be moved outwardly, upwardly or in an arcuate manner in an almost universal fashion. A normal pivot, of course, would not permit such interaction between the arms. Slot 10' further permits limited axial movement of one of the arms with respect to the other. Hence, when heads 20 and 22 are brought together, head 20 naturally rides up on curved end 38 of head 22 as arm 10 moves upwardly with respect to arm 12 until pivot member 14 strikes the lower end of slot 10'. Mating of heads 20 and 22 in this fashion presents a neater tool and permits ease of hooking the heads together. Moreover, as seen in FIGS. 2 and 4, pivot member 14 in its unique fashion maintains arms 10 and 12 apart from each other.

FIGS. 5 and 6 show as further modifications to the device of the present invention, examples of different heads that may be pivotally secured to the arms. In FIG. 5, is shown a head 120 having a plurality of fingers 122 extending downwardly therefrom and a slot 132 extending along an upper edge thereof through which an arm 110 passes. Like heads 20 and 22 shown in FIGS. 1 through 4, head 120 of FIG. 5 would likewise curve inwardly at its lower end as may be seen in FIG. 7. The fingers 122 of head 120 would not be the true equivalent of tines as are used on yard rakes and the like. Instead, the lower ends 124 of fingers 122 are round and thus prevent fingers 122 from piercing objects as they are lifted. Additionally, fingers 122 are not flexible in the sense of the garden rake tine. Thus the weight of an article being lifted would not overcome the resiliency of fingers 122 so as to fall from within the grasp of the device.

A further head 220 is shown in FIG. 6. Head 220 represents a solid sheet of material with a slot 232 extending along an upper edge thereof through which an arm 210 passes. An inwardly curved lower end 236 is also provided on head 220. Referring to FIGS. 5, 6 and 7, heads 120 and 220 are shown to have a similar side view as shown in FIG. 7.

The tool of the present invention, when inverted, provides forward ends 20' and 22' of heads 20 and 22 respectively that may serve as a small rake. With heads 20 and 22 locked together by latch 46, a narrow opening is provided therebetween that may be used to rake in small areas where the normal yard rake is too wide. As the present tool is inverted, the handles 10 and 12 move down the slots 32 and 34 to again adjust the tool to the height of the individual using same. Hence, another use of the very versatile tool of the present invention is illustrated.

Insofar as the device of the present invention is concerned, various and sundry materials may be used for manufacture of the device or component parts thereof. Obviously, to better facilitate use of the device, a lightweight material is preferable, such as aluminum, though a light gage steel, a suitable plastic, or the like may be suitably employed. The heads pivotally attached to the arms of the device, as shown in the FIGS. may be an open network or solid and may have a flat lower edge or an irregular but smooth lower edge. Expanded metal is preferred for the head of the device of the present invention due to its light weight, and also due to the fact that in picking up debris and the like, very small particles will pass through the openings in the expanded metal and will fall back to the ground.

Additionally, insofar as the present invention is concerned, rubber grips or the like may be employed on the handles, the latch means may be moved from the heads up the arms, and springs may be employed to return the arms to a neutral location in the slots.

Having described the present invention in detail, it is obvious that one skilled in the art will be able to make variations and modifications thereto without departing from the scope of the invention. Accordingly, the scope of the present invention should be determined by the claims appended hereto.

What is claimed is:

1. A pick-up tool or the like comprising:
   a. a pair of arms, said arms being approximately parallel at an end thereof and being pivotally connected to and separate from each other at said end; and
   b. a lifting head pivotally secured to an opposite end of each arm, said head further being curved inwardly at a bottom end.

2. A pick-up tool or the like as defined in claim 1 wherein said pivotal connection for said arms is substantially universal.

3. A pick-up tool or the like as defined in claim 1 wherein said pivotal connection between said arms is provided by a pivot member extending horizontally through a first of said arms and then being U-shaped, one leg of said "U" returning to extend vertically through the second of said arms.

4. A pick-up tool or the like as defined in claim 3 wherein one of said arms is provided with a longitudinal slot through which said pivot member extends.

5. A pick-up tool or the like as defined in claim 1 wherein said heads are expanded metal.

6. A pick-up tool or the like as defined in claim 1 wherein said heads have a slot along an upper edge thereof through which the respective arms pass.

7. A pick-up tool or the like as defined in claim 1 further comprising latch means secured to one of said heads and being removably securable to the other of said heads.

8. A pick-up tool or the like as defined in claim 1 wherein said heads have smooth protrusions extending downwardly therefrom to permit easy travel of said head across a surface without danger of puncture of the object being picked up.

9. A pick-up tool or the like as defined in claim 1 wherein said pivotal connection for said arms is provided by a pivot member extending horizontally through a first of said arms and then being U-shaped, one leg of said "U" extending vertically through the second of said arms, and wherein each said head has a slot along an upper edge thereof through which said arm for said head passes.

10. A pick-up tool or the like as defined in claim 9 comprising further latch means secured to one head and being removably securable to said other head.

* * * * *